Patented Sept. 10, 1935

2,013,972

UNITED STATES PATENT OFFICE 2,013,972

BITUMINOUS PAVING MATERIAL

Samuel S. Sadtler, Springfield Township, Montgomery County, and Woolsey H. Field, Wyncote, Pa.

No Drawing. Application February 21, 1934, Serial No. 712,310

19 Claims. (Cl. 106—31)

Our invention relates to the coating of various kinds of mineral aggregate with bituminous emulsions and to the production of bituminous emulsions which are adapted with which to coat pieces of mineral aggregate to bind them firmly together as a compact course or strata of a bituminous concrete roadway.

It has heretofore been attempted to utilize emulsions of bitumens with which to coat the individual pieces of a mineral aggregate, and, after so coating them, to add an ingredient which would break the emulsion and precipitate the bitumen out of the emulsion on to the surface of the stone. But in those emulsions, which are oil-in-water emulsions, the water constituting the external phase of the emulsion and the stone is necessarily provided with a wet surface on which the bitumen is precipitated. The very water of the emulsion precludes the attainment of a strong bond of the bitumen to the stone.

Moreover, the deposit of oil or bitumen on the stone out of the ordinary emulsion heretofore used is too thin to form a cement operative to firmly bind the coated pieces to each other in a course of pavement. In such emulsions the quantity of water greatly exceeds the quantity of the oil or bitumen so that when the course is laid and the volatiles, including the water, are dissipated in the atmosphere, the actual quantity or thickness of the bituminous coating is too thin to act well as a binder for the pieces of aggregate.

Thus it is that the bitumen so precipitated out of emulsions in which the water is in the external phase, is not attached strongly to the stone, except insofar as it may be keyed into the pores of the stone previously filled with the aqueous emulsion, provided the thickness of the deposited material is sufficient to fill such pores or interstices as have rough or undercut side walls. Where the mineral aggregate is non-absorbent and the water is entirely on the surface, the bond between the aggregate and the bitumen precipitated out of an aqueous dispersion is not strong.

It is an object of the present invention to make an emulsion of bitumen suitable for use in making bituminous concrete, which may be used on either wet or on dry stone aggregate, with both of which it will make firm permanent contact and which has a body sufficient to form on the pieces of aggregate a bituminous coating of any desired thickness.

A further object of this invention is to make a bituminous cement emulsion which is suitable for use in penetration and patching processes, the emulsion having the freely flowing properties necessary for such purposes and which will spread over and strongly adhere to the pieces of aggregate as a thick coating.

A further object of this invention is to produce a bituminous emulsion which can be applied cold to unheated mineral aggregate, wet or dry, porous or non-porous, at atmospheric temperatures, that is to say, without the application of artificial heat to the aggregate or to the emulsion and under practically any and all climatic conditions.

A further object of this invention is to produce a bituminous emulsion, which may be warmed and which may be exposed to freezing conditions, without breaking or disrupting the emulsion, thus possessing stability to a degree not known to exist in other bituminous emulsions heretofore used in the art, so far as we are aware.

A further object of this invention is to make an emulsion of a bitumen in which, at first, the water constitutes the external phase and to thereafter convert said emulsion into one in which the water is in the internal phase, thus substantially removing the water from the surface of the stone and replacing it with bitumen (the external phase of the emulsion) in direct intimate contact with the stone, and in so doing, to impart to the cement, after application to the aggregate and allowing the volatiles to evaporate, a water-resisting property greatly in excess of anything heretofore attained.

A further object of this invention is to make an oil-in-water emulsion of a bituminous cement and to convert it into a water-in-oil emulsion concomitantly with the application thereof as a coating to an aggregate and to impart to the cement so formed on the pieces of aggregate a strong affinity to the aggregate, to thus insure a firm adherence of the coating to the aggregate.

A further object of the invention is to produce an emulsion having the body and a consistency practically the same as that of the bituminous cements ordinarily used as binders for bituminous concrete, with the result that an emulsified bituminous coating of substantially any desired thickness may be made to completely cover each piece of aggregate and (like an un-emulsified bituminous cement) be operative to firmly hold the contiguous cohering pieces firmly fixed in the paving course after placement and compaction.

A further object of this invention is to provide a process of coating an unheated mineral aggregate with an unheated bituminous emulsion under substantially any climatic conditions thereby obviating the necessity of heaters for drying or for heating the stone and heaters for maintaining the cement in fluid condition.

A further object of this invention is to make an emulsion of bitumen and water which may be stored in still tanks or drums for long periods at practically any temperatures below substantially 212° F. without separation or deterioration.

A further object of this invention is to produce a dispersion or emulsion of bitumen and water, which if the water be frozen, will not be ruptured by the subsequent melting of the frozen water, whether the emulsion be in storage tanks or on the aggregate.

Other objects of the invention will appear in the specification and claims below.

In describing our method of procedure in its several modifications reference will be made to the use of asphalts as representative of the various bitumens, other forms of which may be used in the practice of our invention. Reference is made to stone as representative of the aggregates which are usually used in road construction and to naphtha as a thinner or solvent or liquefier of the bitumen as representative of the materials which may be used.

In general, the invention involves the making with soap, in a variety of ways, an oil-in-water emulsion or dispersion of bitumen in a water soluble soap solution and in then inverting or converting that emulsion into a water-in-oil emulsion or dispersion and the water soluble soap into water insoluble salts of the fatty acids by adding to the oil-in-water emulsion a relatively small quantity of an inverting agent such as aluminum sulphate, or aluminum hydroxid, or a salt of one of the heavy metals, and thoroughly agitating the same.

Of the many variations, in consistency, asphalt content, and water-resisting property, all of which may vary in different localities, depending upon the material available, below are two formulæ (A and B) which will exemplify the manner in which the conversion of an oil-in-water emulsion into a water-in-oil emulsion may be effected:

USING RESIDUAL OIL ASPHALT

*Formula A*

| | |
|---|---|
| Asphalt (about 100 penetration) | 60 grams |
| Naphtha (moderately volatile) say 50° to 60° Baumé | 25 c. c. |
| Water | 15 c. c. |
| Powdered soap | 0.5 gm. |
| Powdered aluminum sulphate | 0.25 gm. |
| Carbon black | 0.10 gm. |

A rapidly revolving vertical shaft with agitator blades or any other suitable colloid mill, may be used as the apparatus. The soap is suspended or dissolved in the water and the agitation is started. The asphalt, cut back with the naphtha, and preferably somewhat warm, is slowly run in. After this operation is accomplished the mixture so formed will be an emulsion of which the water is in the external continuous phase. The aluminum sulphate is now added to effect and/or stabilize the inversion of the phase and finally the carbon black is added to strengthen the water-in-oil emulsion.

The oil-in-water emulsion which first forms is brownish in color but it is changed, when the inversion takes place, to a black water-in-oil emulsion by the aluminum sulphate and this is fortified by the carbon black which apparently coats the fine water globules of the aqueous phase, although it first contacts with the external phase which is oil. If difficulty is encountered in effecting the inversion, that is to say, if the inversion is too slow, a larger proportion of the aluminum salt may be used to hasten the reaction. The carbon, which may be added, also facilitates the change, working together with the aluminum salt.

The salts of the heavy metals, such as copper, lead, nickel, chromium and zinc or aluminum hydroxid, may be used instead of the aluminum sulphate, but the latter is cheap and very satisfactory. The salts of the alkaline earth metals are ineffective, as they tend to break oil-in-water emulsions rather than to invert them.

In place of gas carbon other forms of carbon, powdered pitch, bituminous coal and similar materials may be used, but it seems that the purer the carbon the better is the result. Gas carbon is both cheap and effective.

USING FUEL OIL

*Formula B*

| | |
|---|---|
| Bunker C fuel oil (or asphalt cutback) | 95 grams |
| Water | 5 c. c. |
| Powdered soap | 0.5 grams |
| Powdered aluminum sulphate | 0.25 grams |
| Gas carbon | 0.10 grams |

As the oil is slowly added to the soap and water, there is first formed an emulsion in which the water is in the continuous phase, but, as more oil is added, an inversion of the phase takes place, probably due to the presence in the oil of impurities which act like the insoluble fatty acids, such as are formed in Example A supra. But the oil, in the discontinuous phase at first, was in a very finely divided state, and when the inversion takes place, the water is correspondingly finely dispersed. The aluminum salt and carbon are added to fortify the emulsion, to give the desired property of water-resistance, and to impart, to the cement, a strong affinity to the aggregate, when applied thereto.

The aqueous external phase should always precede the aqueous internal phase, because in this manner the water and the bitumen can be more evenly separated so that when the phases are reversed the water will be in such fine particles that it will not conglomerate by storage, heat or freezing.

When the material is to be used for coating a wet stone, an emulsion should be selected that does not initially contain too much water so that the material will have sufficient capacity to take up or absorb all the water on the surface of the aggregate.

In the two examples above given, only one-third as much water is employed in Formula B as was indicated in Formula A.

This emulsion so prepared and in substantially the proportions indicated, may be run into drums, tanks or cars for shipment. The emulsion is very stable; it is not substantially effected by the changes in temperature and even if submitted to freezing conditions, the water being in the internal phase will not disrupt the emulsion, due to the elasticity of the external phase of the emulsion. In fact it is difficult to break the emulsion except by an evaporation of the water, or by squeezing out the water by compression.

The material may be used with which to coat a stone aggregate for the making of bituminous concrete in any of the well known ways, as in a mixing mill, or it may be used as a penetration cement spread or poured over a layer of stone on the roadway. It is also adapted for use in patching bituminous roads, for the cement, so made, has a strong affinity for a mineral aggregate, wet or dry, and is of a consistency or body substantially like that of the bituminous cements which have heretofore been used in the making of bituminous concrete; that is to say, it will form on the stone a coating or layer of thickness substantially like that which is produced by the use of the bituminous cements ordinarily employed for the purpose.

When the mineral aggregate coated with our bituminous cement made in the manner above described is first prepared, the mass is discrete and does not strongly adhere together so that after coating, the coated aggregate may be spread in the usual manner on the roadway and compacted by tamping or by a heavy compression roller. This is due to the fact that the cement contains a substantial quantity of the naphtha or other cut-back and a substantial quantity of water. When, however, the material is laid in a comparatively thin course of pavement, a large surface of it is exposed, and, when compacted, the emulsion is disrupted, the expressed water is visible on the surface of the course, and the volatiles therein soon evaporate. The coated pieces will then be held firmly bound together, as a paving course, by the bituminous cement, which completely covers each piece of aggregate and is of a thickness sufficient to bind firmly together the contiguous contacting pieces of coated aggregate in the finished roadway.

A TWO-STAGE PROCESS

But this invention is not to be construed as relating merely to the making of a bituminous cement, for the emulsions may be formed and may be converted as to phase during the very step of providing stone or other mineral aggregate with a bituminous coating. To illustrate, the following examples are given:

*Formula C*

| | |
|---|---|
| Damp stone | 1890 pounds |
| Powdered soap | 1 pound |
| Naphtha | ½ to 1 gallon |
| First stage asphalt (cut back) | 10 pounds |
| Aluminum sulphate | ½ pound |
| Second stage asphalt (cut back) | 100 pounds |

The naphtha gives fluidity to the asphalts which may be of any suitable penetration, e. g., 100. With siliceous aggregate, e. g., trap rock, powdered limestone may be added to the mix, preferably about 16 pounds to the ton of finished mixture, to keep the cement on the alkaline side.

In practising this two-stage process, during the first stage, only a small quantity of asphalt is applied to the stone, but it should be sufficient to form a relatively thin film or coating on the surface of the stone. Substantially 10% of the asphalt which is to be finally added to the stone, is preferably used during the first stage. This is because it is comparatively easy to convert a small quantity of the oil-in-water emulsion into a water-in-oil emulsion, and because, after conversion, as much more oil (bitumen) may be added as is required to produce the desired thickness of the fluid coating, without disturbing the water-in-oil phase of the second emulsion.

Thus the required amount of aggregate having been placed in the mixer, the soap which may be dissolved in water, is first added, and the agitation is started. When the soap solution has been distributed over the stone, the naphtha is preferably added, and then the bitumen (substantially 10 pounds) is added. The bitumen may be dissolved in the solvent before the introduction into the mixer. When the pieces of aggregate are thoroughly covered with the oil-in-water emulsion so produced, the aluminum sulphate is added while the agitation is continued. After a short time (practically less than a minute) the oil-in-water emulsion first covering the stones will be converted into a water-in-oil emulsion which will present the bright shiny appearance of freshly coated stone. The water completely disappears, having gone into and forming the internal discontinuous phase of the emulsion.

Thereafter the balance of the asphalt or other bitumen, for instance, 100 pounds in the Example C above given, may be then added, thereby placing on the surface of the stone as much asphalt as is usually employed in the preparation of a bituminous concrete mixture using an ordinary unemulsified bituminous cement.

But the bituminous coating formed on the surface of the pieces of aggregate treated will be a very thin film at the completion of the first stage of the two-stage process. It provides a surfacing to the stone to which a final coating of bituminous cement will readily cohere. The film is water repellent and, therefore, the film coated aggregate may be provided with its complete coating of bitumen by the second stage of the two-stage process immediately or at some later time.

Since, however, the pre-coating of the aggregate with a thin water-resisting bituminous film for the purpose of preparing an aggregate to which a final bituminous coating may be added in a variety of ways, and preferable at the time when the roadway being actually constructed, forms the subject-matter of our copending application, Serial No. 672,737, filed May 24, 1933, the present process will be considered as one of providing the aggregate with a thick water-in-oil coating, preferably promptly after the water-in-oil film has been formed thereon, and by the inversion of an oil-in-water emulsion.

When, therefore, the stone has been provided with the thin film-like coating of water-in-oil emulsion, the balance of the bitumen indicated in Formula C above as the second stage asphalt, in any quantity desired depending upon the thickness of the coating with which the stone is to be provided and usually in the neighborhood of 100 pounds is added for each ton of mixture under treatment. It may be a cut-back bitumen. In any event, it should be fluid enough to be poured into the mixing machine while the agitation is being continued. To obtain fluidity it may be warmed enough to make it flow freely. The result is that the water-in-oil emulsion is thoroughly mixed with the added bitumen and the finely divided water in the internal phase is dispersed in minute globules throughout the cement.

The entire process may be carried on, and preferably is practised, without the application of external heat to either the bitumen or the stone. If the stone being used is dry, it is necessarily dampened by reason of the formation thereon of the first emulsion, an oil-in-water emulsion.

When the aggregate to be treated is a porous or finely divided, liquid asphalts, soft and slowly flowing, such as Bunker C fuel oil, or mixtures of this fuel oil with asphalts that are liquid at ordinary temperatures (70° F.) may be used.

For complete mixes, containing from 3% to 4% of bitumen for an aggregate size of 1½ inches, or from 5% to 6% for half inch aggregate or smaller, we proceed as in Formulæ C, D, E but use asphalt preferably of from 85 to 110 penetration.

It is to be noted that in all these mixes, no use is made of calcium hydroxid or calcium oxid, as the soap tends to react with them rather than with the heavy metal compounds and aluminum hydroxid, but calcium carbonate may be used in the form of whiting, powdered limestone and the like with siliceous aggregate. The amounts which are preferably used run from 6 to 16 pounds to the ton mixes.

The stone thus coated will remain discrete and will not stick together to an extent sufficient to prevent the ready placement thereof on a roadbed in a substantially thin course after the lapse of a considerable length of time. So long as the water and the volatile ingredients remain on the cement, the mass can be readily handled for transportation and placement on the roadway.

But when a course is spread on the roadway and compacted, the volatiles disappear in a relatively short time and since the real quantity of volatiles constitute only a relatively small fraction of the water-in-oil emulsion, any substantial shrinkage in the thickness of the coating layer of bitumen will be practically negligible.

A MODIFIED FIRST STAGE OF A TWO-STAGE PROCESS

But the providing of the aggregate with the film resulting from the first stage of a two-stage process, may be performed in a variety of ways. Two examples thereof or formulæ therefor, are given as follows:

*Formula D*

| | | |
|---|---|---|
| Half inch stone, damp | 1988 | pounds |
| Powder consisting of: | | |
| Soap | 12 | ounces |
| Aluminum hydroxid (finely divided) | 5 | ounces |
| Naphtha | 1½ | gallons |
| Asphalt 40-50 penetration | 12 | pounds |
| Cut back with naphtha | 7 | pounds |

In carrying out this process, a graded stone or slag in predetermined quantities is used and it is not damp, water may be added to facilitate the carrying out of the process. The pug mill is used to agitate the aggregate and other ingredients. To the damp stone under agitation, is added a mixture of soap and aluminum hydroxid; this is followed by the addition of the bitumen solvent and that followed by the bitumen. The bitumen may be added as a cut-back with all the naptha required to spread it adequately over the stone. After the soap has dispersed the naphtha and the bitumen with the alumina goes into the solution assisted by the sodium hydroxid set free by the dissociation of the soap and forms aluminum compounds of the fatty acid of the soap.

A FURTHER MODIFIED FIRST STAGE OF A TWO-STAGE PROCESS

*Formula E*

| | | |
|---|---|---|
| Stone aggregate, damp (½" size) | 2000 | pounds |
| Powdered soap | 12 | ounces |
| Zinc oxid | 6 | ounces |
| Naphtha | 1½ | gallons |
| Asphalt (100 penetration) | 12 | pounds |
| Cut back with | | |
| Naphtha | 7 | pounds |
| Powdered pitch (if desired) | 2 | pounds |

The preferable order of this mixing is: to the damp stone, in agitation, is added the powdered soap; then the zinc oxid; then the naphtha and finally the asphalt cut back to fluidity with the naphtha.

Any kind of fatty acid soap may be used in all these processes. But ordinary soda soap, in chips or powder, operates very well. The aluminum hydroxid and the zinc oxid appear to act with equally good results, but the aluminum hydroxid in the form of powdered bauxite is about the cheapest satisfactory oxid or hydroxid of a metal forming insoluble fatty or resin compounds of which we are now aware. But the oxid or hydroxides of iron, copper, lead, nickel, manganese and the like are regarded by us as equivalents of the salts above specified in Formulæ A to E inclusive.

A ONE-STAGE PROCESS

Although the coating of aggregate by a two-stage process, such as has been above referred to is preferable because it is easier to accomplish, the full quantity of bitumen may be added at one time and the water-in-oil emulsion produced from the oil-in-water emulsion by the use of the relatively large proportion of the bitumen. The quantities of the ingredients will vary very little from those indicated for the two-stage process C spura, but the following example will indicate some small variations:

*Formula F*

| | | |
|---|---|---|
| Damp stone | 1890 | pounds |
| Added water | 1 | gallon |
| Powdered soap | 2 | pounds |
| Naphtha | ½ to 1 | gallon |
| Asphalt (cut back) | 110 | pounds |
| Aluminum sulphate | 1 | pound |

The stone having been placed in the mixing machine and the water and soap added, the mass is agitated until the stone is fully covered with the soapy water to which the naphtha may be added. This really makes an oil-in-water emulsion of the liquefier. Then the bituminous cement of desired penetration, and cut back to free fluidity, is added, all of it, and the agitation is continued. The thorough agitation of this mixture together is operative to produce an emulsion in which the water is in the external or continuous phase. When the stone is thus coated with the oil-in-water emulsion, the aluminum sulphate is added to effect the inversion of the emulsion into a water-in-oil emulsion. It is desirable to add the carbon black at or about the same time that the aluminum sulphate is added, because it facilitates the inversion or conversion of the emulsion and because it contributes to the permanency or stability of the emulsive coating. Particularly, in the use of limestone aggregates, is the use of carbon black, or other carbonaceous ingredient, desirable, for it appears to increase the electro-negative character of the cement and the affinity of the cement to the aggregate, for a limestone aggregate is, generally speaking, electro-positive in its character.

Where the bituminous concrete for any surface, such as roads, landing fields for aeroplanes, roofs, docks, etc., must be very tenacious, we may and preferably add to the mixtures an ingredient which provides great strength. We have found that short length vegetable fibers, such as cotton seed hull fibers; comminuted peanut hulls; disintegrated bagasse and the like, give great strength to an asphaltic concrete and if such fibers are waterproofed with an insoluble salt of a fatty acid, such as aluminum or zinc oleate which may be that formed in the mix by the reaction of the emulsion inverting salt and are fully coated with bitumen, the fibers are essentially preserved permanently.

Below are given two formulæ for two-stage mixes wherein the pieces of aggregate are graded for say half inch aggregates. The Formula G indicates the quantities and proportions preferably used when the aggregate is of trap rock or other siliceous material, and Formula H is for a mix wherein the aggregate is dolomite or limestone. The formulæ are as follows:

TWO-STAGE PROCESS WITH STRENGTHENER

|  | Formula G | Formula H |
|---|---|---|
| Stone (damp or wetted) | 1875 lbs. | 1875 lbs. |
| Soap (ordinary flake or powder) | 2 lbs. | 2 lbs. |
| Naphtha | ½ to 1 gal. | ½ to 1 gal. |
| 1st stage asphalt (110 penetration) with enough naphtha to slowly flow | 15 lbs. | 15 lbs. |
| Aluminum sulphate | ½ to 1 lb. | ½ to 1 lb. |
| 2d stage asphalt (substantially 80 penetration) | 105 lbs. | 105 lbs. |
| Cotton seed hull fibers | 1 to 4 lbs. | 1 to 4 lbs. |
| Powdered limestone | 16 lbs. |  |
| Powdered coal |  | 2 lbs. |

The ingredients of this mixture should be introduced in the order above set forth.

While the percentage of these fibers is low, running from one pound to four pounds per ton of the batch, when they are fully distributed throughout the batch there are a number of fibers attached to each and every piece of asphalt-coated aggregate, making of the mix a reinforced waterproofed asphaltic concrete which, when placed on the roadway and after the evaporation of the volatiles therein, greatly strengthens the bond between the contiguous pieces of coated aggregate which results in a firm course or stratum of pavement.

It is to be understood that the use of the carbon or coal or powdered pitch is particularly useful when the aggregate is limestone and porous, and that the use of the powdered limestone is particularly efficacious when the aggregate is acidic. The limestone may be employed to advantage in some of the mixes as when the aggregate is siliceous and carbon, with the limestone or whenever it is needed to assist in the conversion of the oil-in-water emulsion or to fix or stabilize it as a water-in-oil emulsion. The powdered limestone, however, is more generally neutral and is employed to keep the cement alkaline and insure a firm contact of the cement to an acidic trap rock rather than as an aid to the inversion of the oil-in-water emulsion or as a stabilizer. It is to be observed that the use of lime in any of these mixes is always avoided as it detracts from the water-resisting properties of the resulting cement by reacting with the heavy metal soap, such as aluminum soap formed by the introduction of the aluminum sulphate.

The fibers are added to the mix after the stone has been covered with its thick coating. The continued agitation of the mixing machine is operative to distribute the fibers uniformly by pulling out or straightening the fibers as the pieces of stone move with respect to each other, due to the tackiness of the cement. If added earlier the clumps of fibers would ball up.

It is also to be understood that the small fibers, in substantially the same proportions to the weight of the finished mixture, may be added in the one-stage process, Formula F, after the pieces of aggregate have been well covered with the water-in-oil emulsion. If desired, the fibers may be waterproofed prior to their introduction into the mix by treating them with an insoluble salt of a fatty acid, such as aluminum or zinc oleate, but the insoluble soaps resulting from the reaction of the inverting ingredient with the water soluble soap of the first emulsion, are generally sufficient to waterproof the little fibers.

While we have described a various number of formulæ involved in the practice of the invention, it is to be noted that in all of them the characteristic of forming with the relatively small amount of water as compared with the amount of oil or bitumen present in the final cement, first, an oil in soapy water emulsion, wherein the water is in the external phase and the oil is in the discontinuous internal phase and that by continued agitation and the admixing thereto or therewith of a salt of a heavy metal or aluminum sulphate, or an oxid of a heavy metal or a hydroxid of alumina, the oil-in-water emulsion is converted or inverted into a water-in-oil emulsion, wherein the water is in the discontinuous phase and the oil (the asphalt or other bitumen) is in the continuous outer phase but capable of absorbing or taking up into the discontinuous phase more water and consequently replacing any water on the surface of the aggregate to which the water-in-oil emulsion is applied and making a firm direct contact between the oil and the stone without the interposition of a film of water therebetween.

It is also to be observed that the proportions recited in the various formulæ are not fixed and invariable. They will vary within reasonable limits dependent upon the properties desired in the final cement, the sizes and kinds of the materials used as the aggregate, and the bitumen employed or available. Such variations are fully within the aim and purport of this invention unless expressly limited thereto in the claims.

Having thus described our invention, what we claim and desire to protect by Letters Patent of the United States is:

1. The method of making a bituminous paving material, which consists in agitating together a fluent bitumen and water to form thereof a bituminous emulsion, in which the bitumen is in the discontinuous phase and the water is in the continuous phase, and adding thereto an ingredient operative to invert said emulsion to one in which the bitumen is in the continuous phase and the water in the discontinuous phase, and then applying said inverted emulsion to a wet mineral road aggregate and agitating the mass until each piece of aggregate is completely coated with said emulsion.

2. The method of making a bituminous paving material, which consists in agitating together a fluent bitumen and water to form thereof a bituminous emulsion, in which the bitumen is in the discontinuous phase and the water is in the continuous phase, and adding thereto, with agitation, a relatively small quantity of a salt of a heavy metal, to invert said emulsion to one in which the bitumen is in the continuous phase and the water in the discontinuous phase, and then applying said inverted emulsion to a wet mineral road aggregate and agitating the mass until each piece of aggregate is completely coated with said emulsion.

3. The method of making a bituminous paving material, which consists in agitating together a fluent bitumen and water to form thereof a bituminous emulsion, in which the bitumen is in the discontinuous phase and the water is in the continuous phase, and adding thereto, with agitation, a small quantity of aluminum sulphate operative to invert said emulsion to one in which the bitumen is in the continuous phase and the water in the discontinuous phase, and then applying said inverted emulsion to a wet mineral road aggregate and agitating the mass until each piece of aggregate is completely coated with said emulsion.

4. The method of making a bituminous material, which consists in agitating together a fluent bitumen and water to form thereof a bituminous emulsion, in which the bitumen is in the discontinuous phase and the water is in the continuous phase, and then adding thereto, with agitation, a small quantity of aluminum sulphate operative to invert said emulsion to one in which the bitumen is in the continuous phase and the water in the discontinuous phase, and then adding to the emulsion finely divided carbon to stabilize said inverted emulsion.

5. The method of making a bituminous material, which consists in agitating together a fluent bitumen and water to form thereof a bituminous emulsion, in which the bitumen is in the discontinuous phase and the water is in the continuous phase, and then adding thereto, with agitation, a small quantity of an oxid of a heavy metal operative to invert said emulsion to one in which the bitumen is in the continuous phase and the water in the discontinuous phase.

6. The method of making a bituminous material, which consists in agitating together a fluent bitumen and water to form thereof a bituminous emulsion, in which the bitumen is in the discontinuous phase and the water is in the continuous phase, and then adding thereto, with agitation, a small quantity of aluminum hydroxid operative to invert said emulsion to one in which the bitumen is in the continuous phase and the water in the discontinuous phase.

7. The method of making a bituminous material, which consists in agitating together a bitumen and water to form an oil-in-water emulsion, then inverting said oil-in-water emulsion to a water-in-oil emulsion and then adding to said water-in-oil emulsion a fluid bitumen to more widely disperse the water throughout the water-in-oil emulsion so formed.

8. The method of making a bituminous coating material, which consists in mixing a bitumen in a fluid condition with water containing a water soluble soap and subjecting said mixture to agitation to form thereof an oil-in-water emulsion in which the water is in the continuous phase of said emulsion, then adding to the said emulsion so formed, with agitation, an inverting agent to invert said oil-in-water emulsion into a water-in-oil emulsion in which the oil is in the continuous phase, and then adding a finely divided carbon to said water-in-oil emulsion to stabilize the same.

9. The method of making a bituminous paving mixture, which consists in agitating a mineral aggregate in the presence of a fluid bituminous cement and soapy water to form an oil-in-water emulsion in which the water is in the continuous phase and the bitumen in the discontinuous phase, and then adding to the mixture so formed and while the agitation is continued, an inverting agent operative to convert, without precipitation, the oil-in-water emulson to a water-in-oil emulsion in which the oil and water are in the continuous and discontinuous phase respectively and to react with the soap of the first emulsion to form water insoluble salts of the fatty acids.

10. The method of making a bituminous paving mixture, which consists in agitating a mineral aggregate in the presence of a fluid bituminous cement and soapy water to form an oil-in-water emulsion in which the water is in the continuous phase and the bitumen in the discontinuous phase, and then adding to the mixture so formed and while the agitation is continued, an inverting agent operative to convert, without precipitation, the oil-in-water emulsion to a water-in-oil emulsion in which the oil and water are in the continuous and discontinuous phase respectively and to react with the soap of the first emulsion to form water insoluble salts of the fatty acids, and then adding, with agitation, more fluid bitumen to the water-in-oil emulsion to increase the thickness of the coating material on the pieces of aggregate and to produce a wider dispersion of the water in the water-in-oil emulsion.

11. The method of making a bituminous paving mixture, which consists in agitating a mineral aggregate in the presence of a fluid bituminous cement and soapy water to form an oil-in-water emulsion in which the water is in the continuous phase and the bitumen in the discontinuous phase, and then adding to the mixture so formed and while the agitation is continued, an inverting agent operative to convert, without precipitation, the oil-in-water emulsion to a water-in-oil emulsion in which the oil and water are in the continuous and discontinuous phase respectively and to react with the soap of the first emulsion to form water insoluble salts of the fatty acids, and finally adding to the mixture, under agitation, finely divided carbon to strengthen and stabilize said water-in-oil emulsion.

12. The method of making a bituminous paving mixture, which consists in agitating a mineral aggregate in the presence of a fluid bituminous cement and soapy water to form an oil-in-water emulsion in which the water is in the continuous phase and the bitumen in the discontinuous phase, and then adding to the mixture so formed and while the agitation is continued, an inverting agent operative to convert, without precipitation, the oil-in-water emulsion to a water-in-oil emulsion in which the oil and water are in the continuous and discontinuous phase respectively and to react with the soap of the first emulsion to form water insoluble salts of the fatty acids, then adding, with agitation, more fluid bitumen to the water-in-oil emulsion to increase the thickness of the coating material on the pieces of aggregate and to produce a wider dispersion of the water in the water-in-oil emulsion, and finally adding to the mixture, under agitation, finely divided carbon to strengthen and stabilize said water-in-oil emulsion.

13. The method of making a bituminous coating material which consists in mixing a mineral aggregate and a bitumen in a fluid condition with water containing a water soluble soap and subjecting said mixture to agitation to form thereof an oil-in-water emulsion in which the water is in the continuous phase of said emulsion, then adding to the said emulsion so formed, with agitation, an inverting agent to invert said oil-in-water emulsion into a water-in-oil emulsion in which the oil is in the continuous phase, and then adding a finely divided carbon to said water-in-oil emulsion to stabilize the same, and after the pieces of aggregate are fully coated with the water-in-oil emulsion so formed, adding to the mixture, under agitation, a relatively small quantity of fibrous material, the fibers of which are short and fine.

14. The method of making a bituminous coating material, which consists in mixing a mineral aggregate and a bitumen in a fluid condition with water containing a water soluble soap and subjecting said mixture to agitation to form thereof an oil-in-water emulsion in which the water is in the continuous phase of said emulsion and then adding to the said emulsion so formed, with agitation, an inverting agent to invert said oil-in-water emulsion into a water-in-oil emulsion in which the oil is in the continuous phase, and after the pieces of aggregate are fully coated with the water-in-oil emulsion so formed, adding to the mixture, under agitation, a relatively small quantity of fibrous material, the fibers of which are short and fine.

15. The method of making a bituminous coating material, which consists in mixing together bitumen containing a water soluble soap, a naphtha solvent of said bitumen and water, and subjecting the mixture to agitation to form thereof an oil-in-water emulsion in which the water is in the continuous external phase of the emulsion and then adding to said emulsion an inverting agent while the agitation of said mixture is being continued to invert said oil-in-water emulsion into a water-in-oil emulsion in which the oil is in the continuous phase.

16. The method of making a bituminous coating material, which consists in mixing together bitumen containing a water soluble soap, a naphtha solvent of said bitumen and water, and subjecting the mixture to agitation to form thereof an oil-in-water emulsion in which the water is in the continuous external phase of the emulsion and then adding to said emulsion an inverting agent while the agitation of said mixture is being continued to invert and said oil-in-water emulsion into a water-in-oil emulsion in which the oil is in the continuous phase, and then adding finely divided carbon to said water-in-oil emulsion to stabilize the same.

17. The method of making a bituminous coating material, which consists in mixing a bitumen ing material, which consists in mixing a bitumen, cut back to fluidity with a bitumen solvent, with water containing a water-soluble soap, and subjecting the mixture to agitation to form thereby an oil-in-water emulsion in which the water is in the continuous phase of the emulsion, and then adding to the emulsion so formed an inverting agent and continuing the agitation of said mixture to invert the oil-in-water emulsion into a water-in-oil emulsion in which the oil is in the continuous phase.

18. The method of making a bituminous coating material, which consists in mixing a bitumen, cut back to fluidity with a bitumen solvent, with water containing a water-soluble soap, and subjecting the mixture to agitation to form thereby an oil-in-water emulsion in which the water is in the continuous phase of the emulsion, and then adding to the emulsion so formed an inverting agent and continuing the agitation of said mixture to invert the oil-in-water emulsion into a water-in-oil emulsion in which the oil is in the continuous phase, and the soap is converted into water insoluble fatty acid salts.

19. The method of providing the pieces of a mineral aggregate with a thick bituminous coating, which consists in agitating the aggregate in the presence of soapy water, naphtha and a relatively small quantity of asphalt cut back to fluidity; then adding to the mixture so formed a relatively small quantity of aluminum sulphate; then adding to the mixture, while the agitation is continued, more asphalt in a fluid condition to provide the pieces of aggregate with a relatively thick coating; then adding to the mixture while the agitation is continued, a small quantity of fibrous material in which the fibers are short and fine, and finally adding to the mixture under agitation, a material which substantially increases the affinity between the asphalt and the pieces of aggregate coated therewith, the proportions of said materials being substantially as follows:

| | |
|---|---|
| Aggregate (damp or wetted) | 1875 lbs. |
| Soap (water soluble) | 1 to 2 lbs. |
| Naphtha | ½ to 1 gal. |
| Asphalt (first added) substantially | 15 lbs. |
| Aluminum sulphate | ½ to 1 lb. |
| Asphalt (subsequently added) | 105 lbs. |
| Fibrous material | 1 to 4 lbs. |
| Material to increase affinity | 2 to 16 lbs. |

SAMUEL S. SADTLER.
WOOLSEY H. FIELD.

CERTIFICATE OF CORRECTION.

Patent No. 2,013,972.                                                                        September 10, 1935.

SAMUEL S. SADTLER, ET AL.

It is hereby certified that error appears in the printed specification of the above numbered patent requiring correction as follows: Page 1, second column, line 34, for "volatides" read volatiles; page 5, second column, line 70, claim 1, for "aggregiate" read aggregate; page 7, first column, line 56, claim 16, strike out the word "and"; and second column, line 4, claim 17, strike out the syllable and words "ing material, which consists in mixing a bitumen"; and that the said Letters Patent should be read with these corrections therein that the same may conform to the record of the case in the Patent Office.

Signed and sealed this 8th day of October, A. D. 1935.

Leslie Frazer (Seal)                                                     Acting Commissioner of Patents.